(12) United States Patent
McMillan et al.

(10) Patent No.: US 7,495,764 B1
(45) Date of Patent: Feb. 24, 2009

(54) COHERENT RADAR AND LADAR POLARIMETER

(75) Inventors: Robert W. McMillan, Owens Cross Roads, AL (US); Ernest J. Holder, Marietta, GA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1244 days.

(21) Appl. No.: 10/631,218

(22) Filed: Jul. 25, 2003

Related U.S. Application Data

(60) Provisional application No. 60/425,775, filed on Nov. 7, 2002.

(51) Int. Cl.
*G01J 4/00* (2006.01)
(52) U.S. Cl. ...................................................... 356/364
(58) Field of Classification Search ........................ None
See application file for complete search history.

(56) References Cited

U.S. PATENT DOCUMENTS

| | | | |
|---|---|---|---|
| 5,841,538 | A | 11/1998 | Schoeffler et al. |
| 6,175,412 | B1 | 1/2001 | Drevillon et al. |
| 6,493,473 | B1 * | 12/2002 | Wooten ........................ 385/11 |
| 6,967,617 | B1 | 11/2005 | McMillan et al. |
| 2002/0140943 | A1 | 10/2002 | Chowdhury et al. |
| 2002/0186435 | A1 * | 12/2002 | Shpantzer et al. ........... 359/136 |

OTHER PUBLICATIONS

Iannarilli et al., "Polarimetric-Spectral Intensity Modulation (P-SIM) . . . Imaging", SPIE Conference, Orlando, FL, Apr. 1999.
Oka, K. and Kato, T. "Spectroscopic Polarimetry . . . Spectrum", Optics Letters, Nov. 1, 1999, vol. 24.
Sabatke et al, "Optimization of Retardance . . . Polarimeter", Optics Letters, vol. 25, No. 11, Jun. 1, 2000.
Goldsmith, P., "Quasioptical Systems", IEEE Press, pp. 71-77, no date.
Born, M. and Wolf, E., "Principles of Optics", Pergamon Press pp. 30-32 and 554-555, no date.
McMillan et al., "An Experimental 225 GHz Pulsed Coherent Radar", Transactions on Microwave Theory and Techniques, Mar. 1991.
Gribbin, J. "Schrodinger's Kittens . . . Reality", pp. 109-115, no date.
Sabatke et al. "A Snapshot Imaging Spectropolarimeter", Procee. of the Multi/Hyperspectral Sensors . . . Workshop, Red. Ars. Nov. 7-9, 2000.
U.S. Appl. No. 10/341,151 to McMillan et al, Filed Jan. 13, 2003, Entitled "A Device and Method . . . Radar Signal".

* cited by examiner

*Primary Examiner*—Tu T Nguyen
(74) *Attorney, Agent, or Firm*—C. John Gilsdorf

(57) ABSTRACT

A polarimeter includes a receiver that is configured to receive a first polarization (P1) of the signal and to split the first polarization of the signal into the in-phase ($I_{P1}$) and quadrature ($Q_{P1}$) components and to receive a second polarization (P2) of the signal and to split the second polarization of the signal into the in-phase ($I_{P2}$) and quadrature ($Q_{P2}$) components. The polarimeter may also include a processor that is configured to receive each of the in-phase and quadrature components (($I_{P1}$), ($Q_{P1}$), ($I_{P2}$), and ($Q_{P2}$)) of the first and second polarizations and to determine the Stokes polarization vector components ($s_0$, $s_1$, $s_2$, and $s_3$) of the signal.

23 Claims, 2 Drawing Sheets

COHERENT RADAR AND LADAR POLARIMETER

CROSS REFERENCE TO RELATED APPLICATION

This application claims benefit of U.S. Provisional Patent Application Ser. No. 60/425,775, filed Nov. 7, 2002, entitled "Coherent Radar and Ladar Polarimeter" the entire contents of which is hereby incorporated herein by reference to the extent necessary to make and practice the present invention.

BACKGROUND OF THE INVENTION

1. Field of the Invention

The present invention relates to devices and methods for determining a state of polarization of an electromagnetic signal and, more particularly, to determining the state of polarization of the signal in an efficient and rapid manner.

2. Related Art

Knowledge of the state of polarization of a signal reflected from a target scene provides a powerful means of discriminating real targets from clutter and background. In general, natural backgrounds giving rise to clutter reflect electromagnetic energy with little change in polarization, while manmade objects cause depolarization of these signals.

In the same way, knowledge of the polarization of electromagnetic radiation emitted passively from a target scene provides a powerful means of discriminating real targets from clutter and background. In general, the emission polarization signatures of manmade objects will be different from that of natural objects.

Identifying the state of polarization of a signal based on determining the Stokes polarization vector components of the signal is known. In particular, a signal, such as a spectral band of light, or electromagnetic radiation in any spectral band, may be characterized as having four Stokes vector components ($s_0$, $s_1$, $s_2$, and $s_3$). The component $s_0$ is proportional to the intensity of the wave. The components $s_1$, $s_2$, and $s_3$ may be related to the orientation of the polarization, e.g., an ellipse and its ellipticity. In general, the orientation of polarization of a plane (planar phase front) monochromatic (single frequency) wave is elliptical. However, the ellipse may degenerate into a straight line in the case of linear polarization, and for circular polarization, the ellipse may degenerate into a circle. Electromagnetic radiation of broad bandwidth (polychromatic radiation) may be considered to comprise many signals each of which is monochromatic and which is generally elliptically polarized as described above.

An elliptically-polarized wave can be considered as the superposition of two waves of arbitrary orthogonal (perpendicular) polarization and amplitude $a_1$ and $a_2$ with phase difference $\delta$. In this case, the components of a Stokes polarization vector ($s_0$, $s_1$, $s_2$, and $s_3$) may be equated to amplitude ($a_1$ and $a_2$) and phase difference ($\delta$) as provided in the Table below:

Table $s_0 = a_1^2 + a_2^2$, $s_1 = a_1^2 - a_2^2$, $s_2 = 2 a_1 a_2 \cos \delta$, $s_3 = 2 a_1 a_2 \sin \delta$.

Accordingly, based on the equations given above, the Stokes vector is known if the parameters $a_1$, $a_2$, and $\delta$ are known. For further details concerning the Stokes polarization vector the reader is referred to the *Principles of Optics,* 3rd Edition, by M. Born and E. Wolf, Pergamon Press, Oxford, 1965, Chapter 1 of which is incorporated herein by reference to the extent necessary to make and practice the present invention.

One known way of measuring the Stokes vector components ($s_0$, $s_1$, $s_2$, and $s_3$) is to place two polarizers and a retarder sequentially in an optical path. Insertion of a first polarizer into the optical path gives a measure of one of the linear polarizations and insertion of a second polarizer is accomplished to give the other linear polarization. A retarder is further inserted into the optical path to retard a signal having a given sense of polarization in phase relative to a signal having another sense, where the two senses are generally orthogonal to each other. Output from the retarder is a signal containing data that can be used to calculate $\delta$ when the linear components are known. The disadvantage of this approach is that it involves moving parts, since these optical components must be placed successively in the optical path. Also, in a dynamic scene, a polarimeter using moving parts would give smeared results, since the scene could change during the times that the polarizers are being changed.

Other ways of measuring the Stokes vector components have been proposed. For example, the paper entitled "Spectroscopic Polarimetry with a Channeled Spectrum" by Kazuhiko Oka and Takayuki Kato, published in *Optics Letters,* Vol. 24, No. 21, Nov. 1, 1999 describes a system for spectropolarimetry which eliminates the need for inserting and removing polarizers into or out of the optical path. In particular, Oka and Kato employ a pair of birefringent retarders and an analyzer to modulate light so that the state of polarization of the light varies with frequency. The modulated light is then passed to a spectrometer or spectrum analyzer and then to a computer where, through Fourier analysis, the state of polarization of the modulated light is determined. Sabatke, et al., in *Optical Engineering* Vol. 41, No. 5, May 2002, describe an imaging spectropolarimeter that uses two optical retarders and a polarizer, together with a Computed Tomographic Imaging Spectrometer, to measure the complete Stokes vector with no moving parts and U.S. patent application Ser. No. 10/341,151 to McMillan, et al., filed Jan. 13, 2003, describes a polarimetric technique usable for microwave and millimeter wave frequencies.

SUMMARY OF THE INVENTION

In accordance with an embodiment of the present invention, a polarimeter comprises a receiver that is configured to receive a first polarization (P1) of the signal and to split the first polarization of the signal into the in-phase ($I_{P1}$) and quadrature ($Q_{P1}$) components and to receive a second polarization (P2) of the signal and to split the second polarization of the signal into the in-phase ($I_{P2}$) and quadrature ($Q_{P2}$) components. The polarimeter may also comprise a processor that is configured to receive each of the in-phase and quadrature components (($I_{P1}$), ($Q_{P1}$), ($I_{P2}$), and ($Q_{P2}$)) of the first and second polarizations and to determine the Stokes polarization vector components ($s_0$, $s_1$, $s_2$, and $s_3$) of the signal.

In accordance with another aspect of the invention, a method for receiving a signal and determining a state of polarization of the signal, comprises receiving a first polarization (P1) of the signal; splitting the first polarization of the signal into the in-phase ($I_{P1}$) and quadrature ($Q_{P1}$) components; receiving a second polarization (P2) of the signal; splitting the second polarization of the signal into the in-phase ($I_{P2}$) and quadrature ($Q_{P2}$) components; and determining the Stokes polarization vector components ($s_0$, $s_1$, $s_2$, and $s_3$);

where:

$s_0 = a_{P1}^2 + a_{P2}^2;$ $s_1 = a_{P1}^2 - a_{P2}^2;$ $s_2 = 2a_{P1}a_{P2} \cos \delta;$ and $s_3 = 2a_{P1}a_{P2} \sin \delta;$ given:

$\delta = \delta_{P1} - \delta_{P2};$ $\delta_i = \tan^{-1}(Q_i/I_i);$ for i=P1, P2; and $a_i^2 = I_i^2 + Q_i^2;$ for i=P1, P2.

In accordance with another aspect of the invention, a computer program determines a state of polarization of a signal and may be embodied on a computer readable medium. Examples of computer-readable media include random access memory (RAM), read only memory (ROM), hard disks, floppy disks, magnetic disks or tape, optical disks, compact disk ROMs (CD-ROMs), digital video disks (DVDs), other memory chips or cartridge storage devices, and other media from which a computer can read. The computer program may comprise: receiving as input in-phase ($I_{P1}$) and quadrature ($Q_{P1}$) components of a first polarization (P1) of the signal; receiving as input in-phase ($I_{P2}$) and quadrature ($Q_{P2}$) components of a second polarization (P2) of the signal; and determining the Stokes polarization vector components ($s_0$, $s_1$, $s_2$, and $s_3$);

where:

$s_0 = a_{P1}^2 + a_{P2}^2;$ $s_1 = a_{P1}^2 - a_{P2}^2;$ $s_2 = 2a_{P1}a_{P2} \cos \delta;$ and $s_3 = 2a_{P1}a_{P2} \sin \delta;$ given:

$\delta = \delta_{P1} - \delta_{P2};$ $\delta_i = \tan^{-1}(Q_i/I_i);$ for i=P1, P2; and $a_i^2 = I_i^2 + Q_i^2;$ for i=P1, P2.

In a further aspect of the invention, a device transmits a signal and determines a state of polarization of a reflected signal. The device comprises a transmitter for transmitting a signal and a receiver for receiving a reflected signal. The receiver may be configured to receive a first polarization (P1) of the reflected signal and to split the first polarization of the reflected signal into the in-phase ($I_{P1}$) and quadrature ($Q_{P1}$) components and receive a second polarization (P2) of the reflected signal and to split the second polarization of reflected signal into the in-phase ($I_{P2}$) and quadrature ($Q_{P2}$) components. The device may also comprise a processor that is configured to receive each of the in-phase and quadrature components (($I_{P1}$), ($Q_{P1}$), ($I_{P2}$), and ($Q_{P2}$)) of the first and second polarizations and to determine the Stokes polarization vector components ($s_0$, $s_1$, $s_2$, and $s_3$) of the reflected signal.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

One embodiment of the present invention concerns a device and a method for determining a state of polarization of an electromagnetic signal in an efficient and rapid manner. In particular, instead of using two birefringent retarders and a polarizer as a modulator as described in the related art, the in-phase and quadrature phase components of the signal, as well as the amplitudes of the components, are used to measure the Stokes vector. In one particular embodiment, a processor may be configured to receive the in-phase and quadrature phase components of the signal and calculate, in real time, the Stokes vector components.

Figure 1:
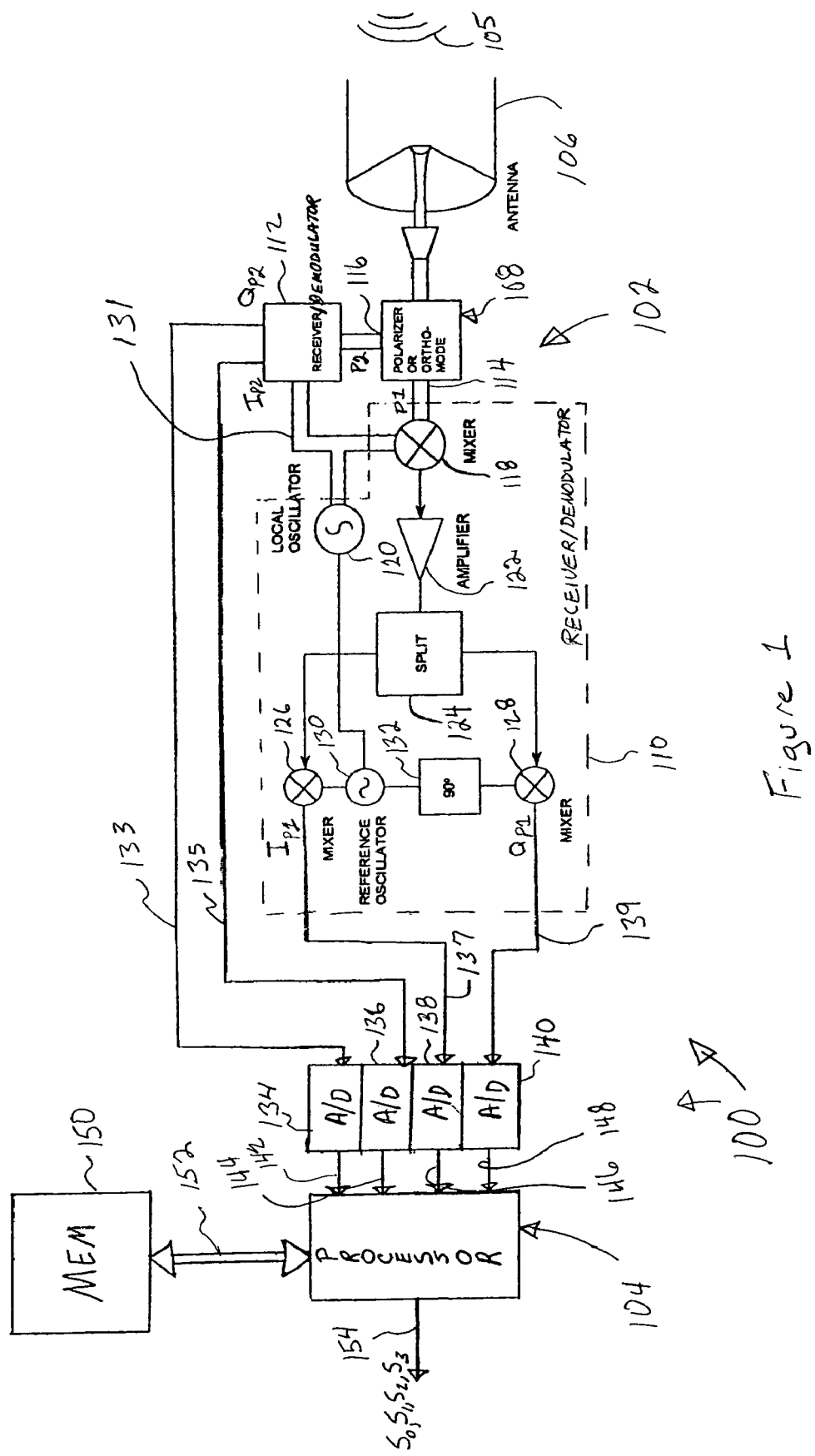
FIG. 1 is a diagram illustrating a polarimetric radiometer in accordance with one embodiment of the present invention.

Referring now to FIG. 1, a polarimeter in accordance with one embodiment of the present invention is illustrated generally at 100. In this embodiment, the polarimeter 100 may comprise a receiver 102 and a processor 104. The receiver 102 may be connected so as to receive a signal 105 which may comprise broadband (polychromatic) radiation. The signal 105 may be captured by an antenna 106 which may be of the Cassegrain type, although, it will be understood that any suitably configured device for receiving a signal at a desired frequency may be employed in the practice of the present embodiment. It will be appreciated that this antenna or objective optic, as described below, is preferably capable of receiving all polarizations of the signal without attenuating or distorting one polarization relative to another. As described in more detail below, the receiver 102 preferably functions to split the signal 105 into orthogonally polarized elements which are then each further split into in-phase and quadrature components later in the process. Also, the receiver 102 is preferably configured to receive signals at microwave or millimeter wave frequencies, although, it will be appreciated that the receiver may be configured to receive at any desired frequency, such as in the visible or infrared spectrum with an appropriate choice of components.

The receiver 102 may comprise an ortho-mode or a polarizer 108, a first mixer/down converter or receiver/demodulator 110 and a second mixer/down converter or receiver/demodulator 112. The polarizer 108 is connected to receive the signal 105 from the antenna 106 and may function in a known manner to output, e.g., orthogonally polarized signals P1, P2 at 114 and 116 that correspond to the signal 105. It will be recognized that the polarizer 108 may comprise a wire grid when the receiver 102 is configured for microwave and millimeter frequencies.

The first receiver/demodulator 110 and second receiver/demodulator 112 may include similar components, therefore for clarity, only the first receiver/demodulator 110 is illustrated and described below.

The first receiver/demodulator 110 may comprise a mixer 118 that is in circuit with a local oscillator 120 and an amplifier 122. The mixer 118 may function to reduce the polarized signal P1 to an intermediate frequency where it may be amplified in the amplifier 122 and then may be passed to a splitter 124. The splitter 124 may be provided to split the polarized signal P1 into an in-phase component $I_{P1}$ and a quadrature component $Q_{P1}$. One splitter found to be suitable for use in the practice of the present embodiment, may be obtained from the Mini-Circuits company of Brooklyn, N.Y.

Connected in circuit with the splitter 124, is a pair of mixers 126, 128 which may be provided for further reduction of the polarized signal components $I_{P1}$, $Q_{P1}$ from an intermediate frequency to baseband or to a second intermediate frequency. While a heterodyne system is preferable, it will be understood that rather than including a reference oscillator and a local oscillator, a homodyne system may be employed where a single oscillator further demodulates the signal components $I_{P1}$, $Q_{P1}$ to baseband. A reference oscillator 130 may be employed in a known manner to provide a selected frequency source to the mixers 126, 128. To maintain the proper phase relationships between the horizontal and vertical components P1 and P2, it may be necessary that the reference oscillator be common to both receivers. A phase shifter 132 may also be interposed between the reference oscillator 130 and the mixer 128.

The second receiver/demodulator 112 may include a local oscillator (not shown) and a mixer (also not shown) that may be phase locked with the local oscillator 120 and the mixer 118 of the receiver/demodulator 120 via a communication line 131. Similar to the output from receiver/demodulator 110, output from the receiver/demodulator 112 are baseband or second intermediate frequency signal components $I_{P2}$, $Q_{P2}$.

The baseband signal components $I_{P1}$, $Q_{P1}$, $I_{P2}$, $Q_{P2}$ each may then be passed, via communication lines 133, 135, 137, 139 to an analog to digital converter 134, 136, 138 and 140 for conversion into digital signals which may then be provided to the processor 104 via separate pathways 142, 144, 146, and 148. While separate digital pathways are shown, it will be appreciated that this is for illustrational purposes only and that a single pathway may be employed.

The processor 104 may be any suitably configured device and may comprise a single processing device or may comprise an electronic control device, a lap top computer or desk top computer system and may communicate with memory storage 150 via a line 152 in a known manner. Accordingly, the term "processor" as used herein is intended to describe any device capable of providing the desired output of a state of polarization of the signal 105. For example, output from the processor 104 may include an indication of an average of the Stokes polarization vector components ($s_0$, $s_1$, $s_2$, and $s_3$) over the bandwidth of the signal 105.

In accordance with one feature of the present invention, the Stokes polarization vector components ($s_0$, $s_1$, $s_2$, and $s_3$) of the signal 105 may be determined via the following formulas:

$$s_0 = a_{P1}^2 + a_{P2}^2;$$

$$s_1 = a_{P1}^2 - a_{P2}^2;$$

$$s_2 = 2 a_{P1} a_{P2} \cos \delta; \text{ and}$$

$$s_3 = 2 a_{P1} a_{P2} \sin \delta;$$

Where:

$$\delta = \delta_{P1} - \delta_{P2};$$

$$\delta_i = \tan^{-1}(Q_i/I_i); \text{ for } i = P1, P2; \text{ and}$$

$$a_i^2 = I_i^2 + Q_i^2; \text{ for } i = P1, P2.$$

In accordance with this embodiment of the present invention, the processor 104 may be programmed, in a known manner via, e.g., firmware or software, to employ the above formulas and output the polarization vector components ($s_0$, $s_1$, $s_2$, and $s_3$) of the signal 105 as illustrated at 154 to a display (not shown) or other device (also not shown) for further analysis such as comparison of the polarization of the target scene to known target polarizations, elimination of signals of unwanted polarization, discrimination of manmade objects from natural backgrounds, and general measurement of the polarization signature of any desired signal or target scene.

Figure 2:
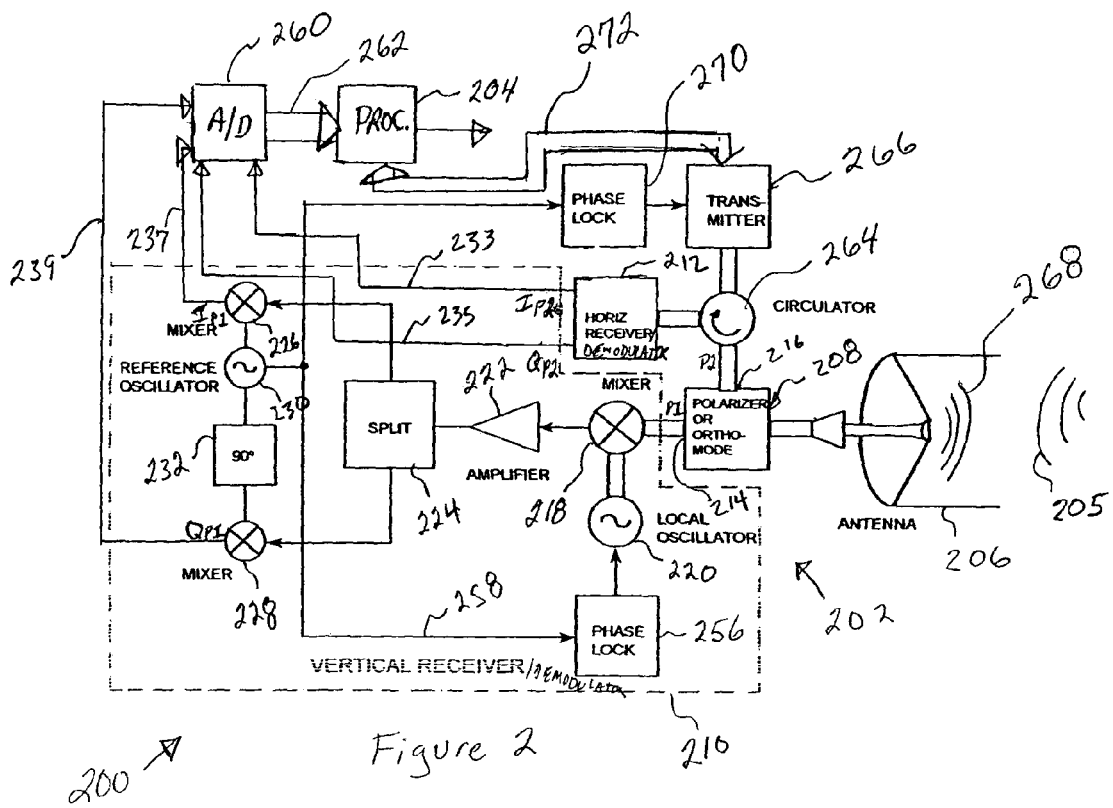
FIG. 2 is a diagram illustrating a radar system in accordance with another embodiment of the present invention.

Another embodiment of a device in accordance with the present invention is illustrated generally at 200 in FIG. 2. In this embodiment, the device 200 comprises a radar system which may include many elements that are similar to those of the polarimeter 100, described above, and which are labeled with similar reference numbers that are preceded by a 2 rather than a 1. For clarity, the device 200 will be generally described with respect to the main differences from the polarimeter 100 and reference may be had above for additional details concerning a similar element.

Similar to the polarimeter 100, the device 200 may comprise a receiver 202, a processor 204 and an antenna 206. The receiver 202 may include a polarizer 208, a first or vertical receiver/demodulator 210 and a second or horizontal receiver/demodulator 212. The terms vertical and horizontal are used throughout the specification to denote a difference in polarization that is preferably orthogonal which, it is believed, simplifies the calculation of the Stokes vector components as described.

The polarizer 208 receives a reflected signal 205 captured by the antenna 206 and may output, e.g., orthogonally polarized signals P1, P2 at 214 and 216. The vertical receiver/demodulator 210 and horizontal receiver/demodulator 212 may include similar components and, for clarity, only the vertical receiver/demodulator is illustrated and described.

Similar to the first receiver/demodulator 110, the vertical receiver/demodulator 210 may comprise a mixer 218, a local oscillator 220, an amplifier 222, a splitter 224, a pair of mixers 226, 228 and a phase shifter 232. The local oscillator 220 may be connected in circuit with a reference oscillator 230, e.g., via a phase lock 256 and a communication line 258. Output from the mixers 226, 228 are baseband signal components $I_{P1}$, $Q_{P1}$ and, similarly, output from the horizontal receiver/demodulator 212 are baseband signal components $I_{P2}$, $Q_{P2}$.

The baseband signal components $I_{P1}$, $Q_{P1}$, $I_{P2}$, $Q_{P2}$ each may then be passed, via communication lines 233, 235, 237, 239 to an analog to digital converter 260 which may be configured to complete conversion of the signal components to, e.g., a concatenated digital signal which may then be conducted to the processor 204 via a single pathway 262.

In the present embodiment, the device 200 may further comprise a circulator 264 and a transmitter 266. The circulator 264 may function in a known manner to separate passage of a signal 268 transmitted by the transmitter 266 from a reflected signal 205 received by the receiver 202. In the configuration shown, the output of the radar is horizontally polarized, but vertical polarization could be transmitted if the circulator and transmitter were placed at the vertical output of the polarizer or orthomode.

The transmitter 266 may be any suitable transmitter preferably operating within radar frequency but may also be capable of operating at any desired frequency and appropriate output power. The transmitter 266 may be electrically connected in a known manner with the reference oscillator 230 via a phase lock 270. The transmitter 266 may also be in communication with the processor 204 via a communication line 272 whereby a transmitted signal 268 may be sampled by the processor so that, e.g., the state of polarization may be determined.

In this embodiment, the processor 204 may be programmed as described above in connection with the processor 104 and may additionally include programming which may use a known or determined state of polarization of the transmitted signal 268 and compare it to the state of polarization of the reflected signal 205 in order to identify a target signature.

Figure 3:
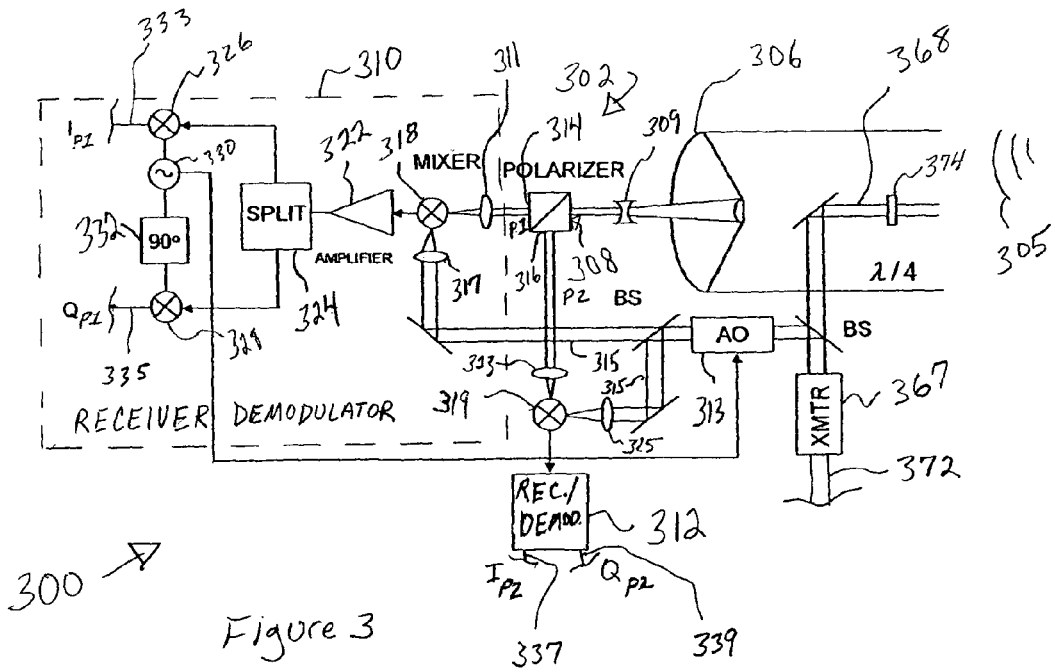
FIG. 3 is a diagram illustrating a portion of a laser radar system in accordance with a further embodiment of the present invention.

Referring now to FIG. 3, another embodiment of a device in accordance with the present invention is illustrated generally at 300. In this embodiment, the device 300 comprises a ladar system which may include many elements that are similar to those of the radar system 200, described above, and which are labeled with similar reference numbers that are preceded by a 3 rather than a 2. For clarity, the device 300 will be generally described with respect to the main differences from the device 200 and reference may be had above for additional details concerning a similar element. Also for clarity, a portion of the device 300 is omitted in FIG. 3 and it will be understood that the device may comprise an analog to digital converter and processor which may be similar to the analog to digital converters and processors, described above in connection with either of FIGS. 1 and 2.

The device 300 may comprise a receiver 302, a processor (not shown) and an antenna or objective optic 306. The receiver 302 may include a polarizer 308, a first receiver/demodulator 310 and a second receiver/demodulator 312. The polarizer 308 receives a reflected signal 305 that may be captured by the antenna 306 and passed through a lens 309 and may output, e.g., orthogonally polarized signals P1, P2 at 314 and 316. The first receiver/demodulator 310 and second receiver/demodulator 312 may include similar components, accordingly, for clarity, only the first receiver/demodulator is illustrated and described.

In the first receiver/demodulator 310, the signal P1 may be passed through a lens 311 to a mixer 318 which may also receive input from an acousto-optic modulator 313 which functions, in a similar manner, e.g., to the local oscillator 220, to provide an energy source 315 at a frequency determined by a reference oscillator 330. A lens 317 may also be provided for focusing the energy source 315 at the mixer 318. A similar arrangement is associated with a mixer 319 which includes lenses 323 and 325 and which supplies the second receiver/demodulator 312.

The first receiver/demodulator 310 may further comprise an amplifier 322, a splitter 324, a pair of mixers 326, 328 and a phase shifter 332. Output from the mixers 326, 328 are baseband signal components $I_{P1}$, $Q_{P1}$ and, similarly, output from the second receiver/demodulator 312 are baseband signal components $I_{P2}$, $Q_{P2}$.

The baseband signal components $I_{P1}$, $Q_{P1}$, $I_{P2}$, $Q_{P2}$ each may then be passed, via communication lines 333, 335, 337, 339 to an analog to digital converter (not shown) which may be configured to complete conversion of the signal components to a digital signal which may then be conducted to the processor (also not shown).

The device 300 may further comprise a transmitter 367 which may be any suitable light frequency transmitter and may also be capable of operating at any appropriate output power. The transmitter 366 may provide source energy to the acousto-optic modulator 313 and may also be in communication with the processor (not shown), as described above in connection with the transmitter 266, via a communication line 372. The transmitter 367 may be further configured to transmit a signal 368 which has a known state of polarization that may be communicated to the processor as also described above. A lens 374 may be provided to collimate a transmitted signal 368.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A polarimeter, comprising:
   a receiver that is configured to:
      receive a first polarization (P1) of a signal and to split the first polarization of the signal into the in-phase ($I_{P1}$) and quadrature ($Q_{P1}$) components; and
      receive a second polarization (P2) of the signal and to split the second polarization of the signal into the in-phase ($I_{P2}$) and quadrature ($Q_{P2}$) components; and
   a processor that is configured to:
      receive each of the in-phase and quadrature components (($I_{P1}$), ($Q_{P1}$), ($I_{P2}$), and ($Q_{P2}$)) of the first and second polarizations; and
      determine the Stokes polarization vector components ($s_0$, $s_1$, $s_2$, and $s_3$) of the signal.

2. The polarimeter of claim 1 wherein the Stokes polarization vector components ($s_0$, $s_1$, $s_2$, and $s_3$) of the signal are determined by:

$$s_0 = a_{P1}^2 + a_{P2}^2;$$

$$s_1 = a_{P1}^2 - a_{P2}^2;$$

$$s_2 = 2a_{P1}a_{P2}\cos\delta; \text{ and}$$

$$s_3 = 2a_{P1}a_{P2}\sin\delta;$$

Where:

$$\delta = \delta_{P1} - \delta_{P2};$$

$$\delta_i = \tan^{-1}(Q_i/I_i); \text{ for } i = P1, P2; \text{ and}$$

$$a_i^2 = I_i^2 + Q_i^2; \text{ for } i = P1, P2.$$

3. The polarimeter of claim 2, wherein the first polarization (P1) is orthogonal to the second polarization (P2).

4. The polarimeter of claim 3, further comprising an antenna and wherein the receiver comprises:
   a polarizer operatively connected with the antenna and comprising a first output and a second output;
   a first receiver/demodulator operatively connected with the first output of the polarizer and being configured to receive and demodulate the first polarization of the signal; and
   a second receiver/demodulator operatively connected with the second output of the polarizer and being configured to receive and demodulate the second polarization of the signal.

5. The polarimeter of claim 4 wherein the first receiver/demodulator comprises:
   a first reference oscillator;
   a first local oscillator operatively connected with the first reference oscillator;
   a first mixer which receives input from the polarizer and the first local oscillator;
   a first amplifier operatively connected with the polarizer;
   a first splitter operatively connected with the first amplifier and functioning to separate the in-phase ($I_{P1}$) and quadrature ($Q_{P1}$) components;
   a first in-phase mixer operatively connected with the first reference oscillator and operatively connected with the first splitter to receive the in-phase ($I_{P1}$) component;
   a first phase shifter operatively connected with the first reference oscillator; and a first quadrature mixer operatively connected with the first phase shifter and operatively connected with the first splitter to receive the quadrature ($Q_{P1}$) component.

6. The polarimeter of claim 5 wherein the second receiver/demodulator comprises:
a second reference oscillator;
a second local oscillator operatively connected with the second reference oscillator;
a second mixer which receives input from the polarizer and the second local oscillator;
a second amplifier operatively connected with the polarizer;
a second splitter operatively connected with the second amplifier and functioning to separate the in-phase ($I_{P2}$) and quadrature ($Q_{P2}$) components;
a second in-phase mixer operatively connected with the second reference oscillator and operatively connected with the second splitter to receive the in-phase ($I_{P2}$) component;
a second phase shifter operatively connected with the second reference oscillator; and
a second quadrature mixer operatively connected with the second phase shifter and operatively connected with the second splitter to receive the quadrature ($Q_{P2}$) component.

7. The polarimeter of claim 1 further comprising an analog to digital converter operatively connected between the receiver and the processor.

8. A method for receiving a signal and determining a state of polarization of the signal, comprising:
receiving a first polarization (P1) of the signal;
splitting the first polarization of the signal into the in-phase ($I_{P1}$) and quadrature ($Q_{P1}$) components;
receiving a second polarization (P2) of the signal;
splitting the second polarization of the signal into the in-phase ($I_{P2}$) and quadrature ($Q_{P2}$) components; and
determining the Stokes polarization vector components ($s_0$, $s_1$, $s_2$, and $s_3$);
where:

$$s_0 = a_{P1}^2 + a_{P2}^2;$$

$$s_1 = a_{P1}^2 - a_{P2}^2;$$

$$s_2 = 2a_{P1}a_{P2}\cos\delta;\text{ and}$$

$$s_3 = 2a_{P1}a_{P2}\sin\delta;$$

given:

$$\delta = \delta_{P1} - \delta_{P2};$$

$$\delta_i = \tan^{-1}(Q_i/I_i);\text{ for } i=P1, P2;\text{ and}$$

$$a_i^2 = I_i^2 + Q_i^2;\text{ for } i=P1, P2.$$

9. A computer program for determining a state of polarization of a signal, the computer program being embodied on a computer readable medium and, the computer program comprising:
receiving as input in-phase ($I_{P1}$) and quadrature ($Q_{P1}$) components of a first polarization (P1) of the signal;
receiving as input in-phase ($I_{P2}$) and quadrature ($Q_{P2}$) components of a second polarization (P2) of the signal; and
determining the Stokes polarization vector components ($s_0$, $s_1$, $s_2$, and $s_3$);

where:

$$s_0 = a_{P1}^2 + a_{P2}^2;$$

$$s_1 = a_{P1}^2 - a_{P2}^2;$$

$$s_2 = 2a_{P1}a_{P2}\cos\delta;\text{ and}$$

$$s_3 = 2a_{P1}a_{P2}\sin\delta;$$

given:

$$\delta = \delta_{P1} - \delta_{P2};$$

$$\delta_i = \tan^{-1}(Q_i/I_i);\text{ for } i=P1, P2;\text{ and}$$

$$a_i^2 = I_i^2 + Q_i^2;\text{ for } i=P1, P2.$$

10. A device for transmitting a signal and determining a state of polarization of a reflected signal, comprising:
a transmitter for transmitting a signal;
a receiver for receiving a reflected signal and that is configured to:
receive a first polarization (P1) of the reflected signal and to split the first polarization of the reflected signal into the in-phase ($I_{P1}$) and quadrature ($Q_{P1}$) components; and
receive a second polarization (P2) of the reflected signal and to split the second polarization of reflected signal into the in-phase ($I_{P2}$) and quadrature ($Q_{P2}$) components; and
a processor that is configured to:
receive each of the in-phase and quadrature components (($I_{P1}$), ($Q_{P1}$), ($I_{P2}$), and ($Q_{P2}$)) of the first and second polarizations; and
determine the Stokes polarization vector components ($s_0$, $s_1$, $s_2$, and $s_3$) of the reflected signal.

11. The device of claim 10 wherein the Stokes polarization vector components ($s_0$, $s_1$, $s_2$, and $s_3$) of the signal are determined by:

$$s_0 = a_{P1}^2 + a_{P2}^2;$$

$$s_1 = a_{P1}^2 - a_{P2}^2;$$

$$s_2 = 2a_{P1}a_{P2}\cos\delta;\text{ and}$$

$$s_3 = 2a_{P1}a_{P2}\sin\delta;$$

Where:

$$\delta = \delta_{P1} - \delta_{P2};$$

$$\delta_i = \tan^{-1}(Q_i/I_i);\text{ for } i=P1, P2;\text{ and}$$

$$a_i^2 = I_i^2 + Q_i^2;\text{ for } i=P1, P2.$$

12. The device of claim 11, wherein the first polarization (P1) is orthogonal to the second polarization (P2).

13. The device of claim 12, further comprising:
an antenna; and
a circulator operatively connected with the antenna and being configured to separate a transmitted signal from a received signal.

14. The device of claim 13, wherein the receiver comprises:
a polarizer operatively connected with the antenna and comprising a first output and a second output;
a first receiver/demodulator operatively connected with the first output of the polarizer and being configured to receive and demodulate the first polarization of the signal; and a second receiver/demodulator operatively connected with the second output of the polarizer and being configured to receive and demodulate the second polarization of the signal.

15. The device of claim 14, wherein the first receiver/demodulator comprises:
a first reference oscillator;
a first local oscillator operatively connected with the first reference oscillator;
a first mixer which receives input from the polarizer and the first local oscillator;
a first amplifier operatively connected with the polarizer;
a first splitter operatively connected with the first amplifier and functioning to separate the in-phase ($I_{P1}$) and quadrature ($Q_{P1}$) components;
a first in-phase mixer operatively connected with the first reference oscillator and operatively connected with the first splitter to receive the in-phase ($I_{P1}$) component;
a first phase shifter operatively connected with the first reference oscillator; and
a first quadrature mixer operatively connected with the first phase shifter and operatively connected with the first splitter to receive the quadrature ($Q_{P1}$) component.

16. The device of claim 15, wherein the second receiver/demodulator comprises:
a second reference oscillator;
a second local oscillator operatively connected with the second reference oscillator;
a second mixer which receives input from the polarizer and the second local oscillator;
a second amplifier operatively connected with the polarizer;
a second splitter operatively connected with the second amplifier and functioning to separate the in-phase ($I_{P2}$) and quadrature ($Q_{P2}$) components;
a second in-phase mixer operatively connected with the second reference oscillator and operatively connected with the second splitter to receive the in-phase ($I_{P2}$) component;
a second phase shifter operatively connected with the second reference oscillator; and
a second quadrature mixer operatively connected with the second phase shifter and operatively connected with the second splitter to receive the quadrature ($Q_{P2}$) component.

17. The device of claim 16, wherein the transmitter comprises a third reference oscillator and the first and second reference oscillators are phase-locked with the first and second local oscillators and with the third reference oscillator.

18. The device of claim 11, wherein the transmitter and the receiver operate at radar frequencies.

19. The device of claim 18, wherein the transmitter and the receiver operate at ladar frequencies.

20. The device of claim 19, further comprising an antenna and wherein the receiver comprises:

a polarizer operatively connected with the antenna and comprising a first output and a second output;
a first receiver/demodulator operatively connected with the first output of the polarizer and being configured to receive and demodulate the first polarization of the signal; and
a second receiver/demodulator operatively connected with the second output of the polarizer and being configured to receive and demodulate the second polarization of the signal.

21. The device of claim 20, wherein the first receiver/demodulator comprises:
a first reference oscillator;
a first acousto-optic modulator operatively connected with the first reference oscillator and the transmitter;
a first mixer which receives input from the polarizer and the first acousto-optic modulator;
a first amplifier operatively connected with the polarizer;
a first splitter operatively connected with the first amplifier and functioning to separate the in-phase ($I_{P1}$) and quadrature ($Q_{P1}$) components;
a first in-phase mixer operatively connected with the first reference oscillator and operatively connected with the first splitter to receive the in-phase ($I_{P1}$) component;
a first phase shifter operatively connected with the first reference oscillator; and
a first quadrature mixer operatively connected with the first phase shifter and operatively connected with the first splitter to receive the quadrature ($Q_{P1}$) component.

22. The device of claim 21, wherein the second receiver/demodulator comprises:
a second reference oscillator;
a second acousto-optic modulator operatively connected with the second reference oscillator and the transmitter;
a second mixer which receives input from the polarizer and the second acousto-optic modulator;
a second amplifier operatively connected with the polarizer;
a second splitter operatively connected with the second amplifier and functioning to separate the in-phase ($I_{P2}$) and quadrature ($Q_{P2}$) components;
a second in-phase mixer operatively connected with the second reference oscillator and operatively connected with the second splitter to receive the in-phase ($I_{P2}$) component;
a second phase shifter operatively connected with the second reference oscillator; and
a second quadrature mixer operatively connected with the second phase shifter and operatively connected with the second splitter to receive the quadrature ($Q_{P2}$) component.

23. The device of claim 10 further comprising an analog to digital converter operatively connected between the receiver and the processor.

* * * * *